United States Patent

Kurakake et al.

Patent Number: 5,148,371
Date of Patent: Sep. 15, 1992

[54] HIGH-SPEED MACHINING SYSTEM

[75] Inventors: Mitsuo Kurakake, Tokyo; Jiro Kinoshita, Minamitsuru, both of Japan

[73] Assignee: Fanuc Ltd., Minamitsuru, Japan

[21] Appl. No.: 722,402

[22] Filed: Jun. 20, 1991

Related U.S. Application Data

[63] Continuation of Ser. No. 342,533, filed as PCT/JP88/00876, Aug. 31, 1988, abandoned.

[30] Foreign Application Priority Data

Sep. 2, 1987 [JP] Japan .............................. 62-220014

[51] Int. Cl.⁵ .......................................... G05B 19/403
[52] U.S. Cl. ........................ 364/474.01; 364/474.22
[58] Field of Search ..................... 364/474.01, 474.02, 364/474.11, 474.22, 130

[56] References Cited

U.S. PATENT DOCUMENTS

| | | | |
|---|---|---|---|
| 4,138,718 | 2/1979 | Toke et al. | 364/900 |
| 4,344,127 | 8/1982 | McDaniel et al. | 364/900 X |
| 4,415,965 | 11/1983 | Imazeki et al. | 364/900 X |
| 4,446,525 | 5/1984 | Hoch et al. | 364/900 X |
| 4,636,938 | 1/1987 | Broome | 364/474.22 X |

Primary Examiner—Joseph Ruggiero
Attorney, Agent, or Firm—Staas & Halsey

[57] ABSTRACT

A high-speed machining system for executing a machining program for a numerical control apparatus at high speed, in which the numerical control apparatus incorporates a hard disk drive (20) for storing a machining program for numerical control, a hard disk control circuit (15), a direct memory access control circuit (14) for transferring the machining program from the hard disk control circuit (15) to a RAM (13), and a microprocessor (12).

The microprocessor (12) converts the machining program stored in the RAM (13) into minute amounts of movement for each axis and transfers the resulting data to a numerical control apparatus CNC 2. Therefore, a high-speed data transfer is possible and high-speed machining can be performed with a simple structure.

2 Claims, 2 Drawing Sheets

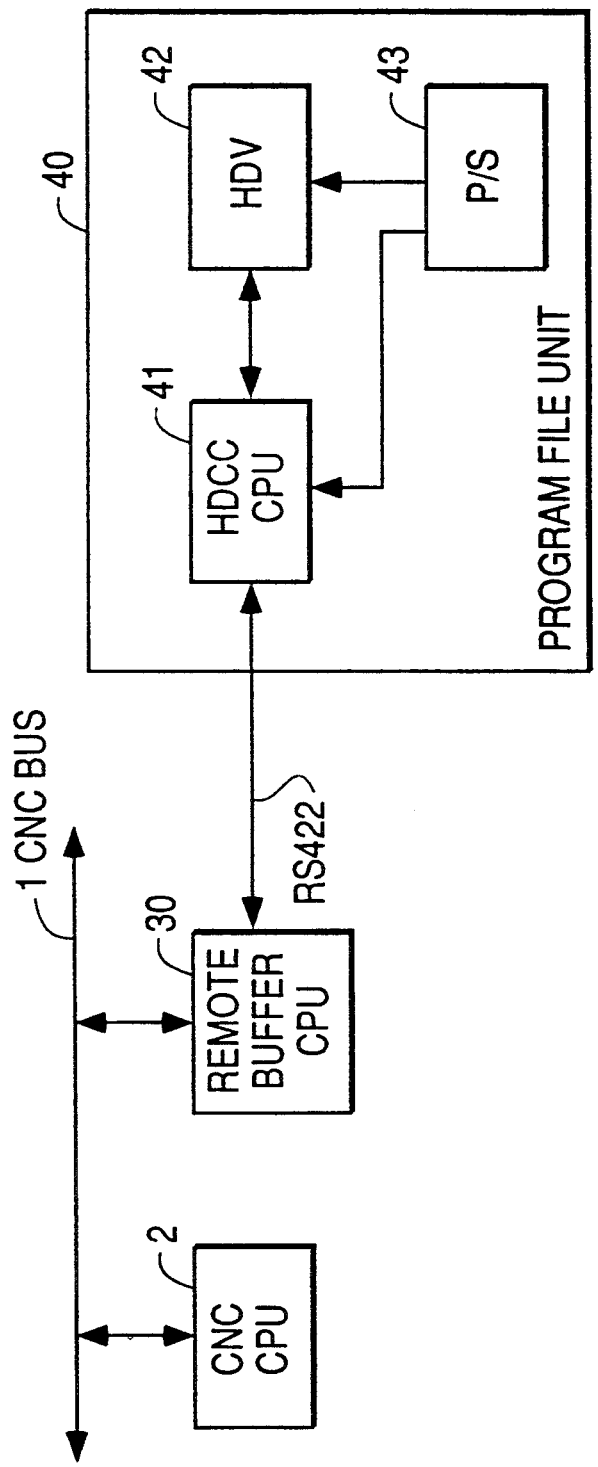

HIGH-SPEED MACHINING SYSTEM

This application is a continuation of application Ser. No. 342,533, filed as PCT/JP88/00876, Aug. 31, 1988, now abandoned.

BACKGROUND OF THE INVENTION

The present invention relates to a high-speed machining system for executing a machining program for a numerical control apparatus at a high speed, and more particularly to a high-speed machining system in which a hard disk drive for storing a machining program is incorporated into a numerical control apparatus with a simple structure.

Machining programs for a numerical control apparatus were formerly recorded on paper tapes or the like and stored, but with the reduction in size of the price of hard disk drives and the like, program files are now practically used for the storage of machining programs.

The interrelationship between a prior art program file and a numerical control apparatus is illustrated in FIG. 2. In FIG. 2, 1 denotes a numerical control CNC bus and 2 denotes a printed circuit board of a CNC processor for global control of the CNC. The numeral 30 represents a printed circuit board of a processor for remote buffer control by which data is input at a high speed from outside, and 40 is a program file unit including a hard disk control circuit 41 and a hard disk drive 42, both supplied with control power from a power supply 43.

The hard disk drive 42 for storing machining programs stores data in the form of short length blocks. This short length block data is delivered, via the hard disk control circuit 41 and an RS422 interface, to the remote buffer 30 and then to the CNC processor 2, which executes the machining control accordingly.

The system wherein short length blocks are transferred in a binary format for machining, such as that shown in FIG. 2, is suitable for high-speed machining, but the input speed to the remote buffer 30 is slow, and the program file unit housed in an external casing and containing the power supply 43 is indispensable, and thus the problem of high cost arises.

SUMMARY OF THE INVENTION

The object of the present invention is to provide a high-speed machining system which solves the above problem and in which a hard disk drive for storing a machining program is incorporated into a numerical control apparatus having a simple structure.

To solve the above problem, the present invention provides a high-speed machining system for executing a machining program for a numerical control apparatus at a high speed, characterized in that the numerical control apparatus includes: a hard disk drive for storing a machining program for numerical control, a hard disk control circuit for controlling the hard disk drive, a direct memory access control circuit for transferring the machining program from the hard disk control circuit to a RAM, and a microprocessor for converting the machining program stored in the RAM into minute amounts of movement and transferring the resulting data t a CNC via a CNC bus.

The hard disk drive performs the data read and write operations under the control of the hard disk control circuit, and the direct memory access control circuit transfers the machining program in the hard disk drive to the RAM through the hard disk control circuit.

The microprocessor converts the machining program stored in the RAM into minute amounts of movement for each axis, delivers the converted data to the RAM for temporary storage, and in accordance with the instructions from the CNC, transfers the data to the CNC directly through the CNC bus.

BRIEF DESCRIPTION OF THE DRAWINGS

FIG. 2 is a diagram of the interrelationship between a prior art program file and a numerical control apparatus.

DESCRIPTION OF THE PREFERRED EMBODIMENT

Figure 1:
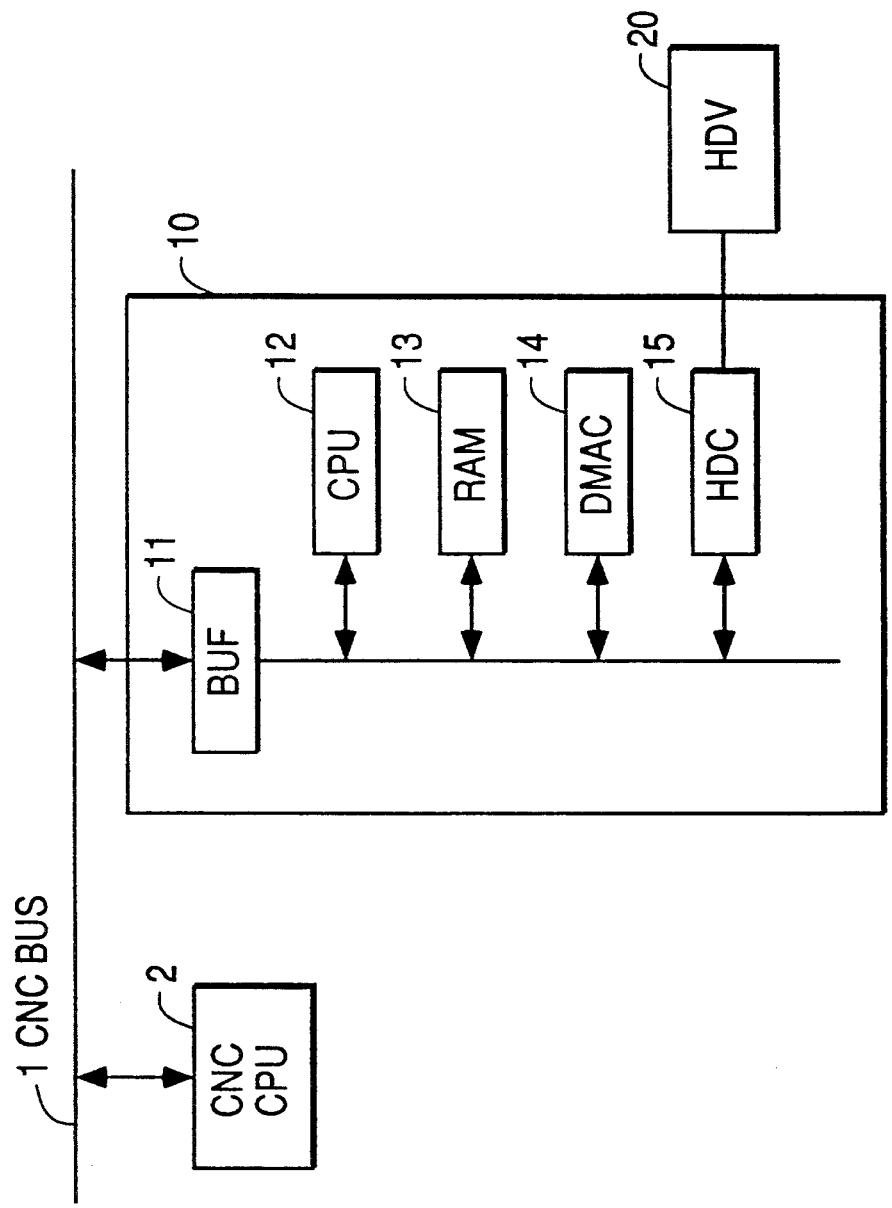
FIG. 1 is a block diagram of an embodiment according to the present invention.

An embodiment of the present invention will be described with reference to the drawings.

FIG. 1 is a block diagram of an embodiment of the present invention. In FIG. 1, 1 denotes a CNC bus, 2 denotes a printed circuit board of a CNC processor for global control of the CNC, 10 designates a printed circuit board for high-speed machining control which divides a machining program stored in a hard disk drive into minute amounts of movement for transfer to the CNC 2, and 20 represents a hard disk drive containing a hard disk for storing machining programs.

The printed board 10 for high-speed machining control will be described in detail. Numeral 11 represents a buffer between the internal bus of the printed circuit board 10 and the CNC bus 1, 12 represents a microprocessor for the conversion and transfer of data, 13 represents a RAM for storing a machining program described hereinafter, etc., 14 represents a direct memory access control circuit for transferring the machining program directly to the RAM, and 15 denotes a hard disk control circuit for controlling the hard disk drive 20 for performing a data transfer.

The transfer of a machining program will be now described. The machining program is first stored in the hard disk of the hard disk drive 20, and then is transferred directly to the RAM 13 through the hard disk control circuit 15 by the direct memory access control circuit 14.

The microprocessor 12 converts the machining program stored in the RAM 13 into minute amounts of movement for each axis, and returns the resulting data to the RAM 13 for storage. Then, in accordance with the instructions from the CNC 2, the microprocessor 12 transfers the minute amounts of movement to the CNC 2 through the buffer 11 and the CNC bus 1.

According to the above-described construction, the machining program, which is to be distributed by the CNC 2, is transferred from the high-speed machining control printed circuit board 10 to the CNC in the form of minute amounts of movement for each axis. Accordingly, a high-speed transfer is possible and the pulse distribution is not interrupted. Furthermore, by recording the minute amounts of movement for each axis, stored in the RAM 13, in the hard disk drive 20, these minute amounts of movement can be used directly on the next occasion after transfer to the RAM 13.

Moreover, the printed circuit board providing these functions, and the hard disk drive, are incorporated into the numerical control apparatus, and therefore, a special program file unit is not required and the system configuration can be simplified.

As described above, according to the invention, the numerical control apparatus incorporates the hard disk drive and the high-speed control functions for converting the machining program stored in the hard disk drive into minute amounts of movement for each axis and for transferring the minute amounts of movement to the CNC through the bus. Accordingly, a data transfer can be executed at high speed, and a special program file unit or similar devices need not be provided externally, whereby the system configuration is simplified.

We claim:

1. A method of executing a pulse distribution of a machine program for a numerical control apparatus at high speed, the method comprising:
   a) storing the machining program for the numerical control apparatus in a hard disk;
   b) transferring the machining program from the hard disk to a RAM of a hard disk control circuit by a direct memory access circuit;
   c) converting the machining program into minute amounts of movement for each axis;
   d) storing the minute amounts of movement in the RAM;
   e) transferring the minute amounts of movement to the numerical control apparatus; and
   f) executing a pulse distribution of the minute amounts of movement.

2. A method of executing a pulse distribution as set forth in claim 1, further comprising the step of:
   g) mounting the hard disk control circuit, the direct memory access circuit, and the RAM in a single printed circuit board as a package.

* * * * *